United States Patent

[11] 3,593,526

[72] Inventors David Parks Hoult
    11 Cameron Road, Wayland, Mass. 01778;
    James Alan Fay, 36 Spruce Hill Road,
    Weston, Mass. 02193
[21] Appl. No. 830,270
[22] Filed June 4, 1969
[45] Patented July 20, 1971

[54] APPARATUS AND METHODS FOR OIL SLICK
    CONTAINMENT
    2 Claims, 4 Drawing Figs.
[52] U.S. Cl. .................................................. 61/1,
    61/5
[51] Int. Cl. ..................................................... E02b 15/04
[50] Field of Search ........................................... 61/1, 6

[56] References Cited
    UNITED STATES PATENTS
1,716,616  6/1929  Brasher ........................ 61/6

3,499,291  3/1970  Mikkelsen ..................... 61/1
    FOREIGN PATENTS
177,557    1961   Sweden ........................ 61/1

Primary Examiner—Jacob Shapiro
Attorney—Martin Kirkpatrick

ABSTRACT: Apparatus and methods for oil slick containment in the open sea, in the presence of waves and currents, utilizing a submerged, segmented, pneumatic boom arranged in zigzag, accordion-pleated configuration in which the included angle between adjoining segments is between about 120° and 20°, with the minimum distance between adjacent apices greater than wave-caused water movement, the boom segments being submerged beneath the water surface at the predetermined depth $d$ in which $d/a$ is in the range of 5 to 10, $a$ being the value of wave amplitude.

APPARATUS AND METHODS FOR OIL SLICK CONTAINMENT

This invention relates to oil slick containment and more particularly to novel methods and apparatus therefor of the submerged pneumatic boom type.

A pneumatic boom, as well known in the art, consists of a long pipe submerged below the surface of the sea. Compressed air supplied to the pipe is ejected through a series of holes drilled through the pipe, producing bubbles which create a rising column of water, generated by the air-water mixture formed at the pipe. At the surface, the rising column of water forms two surface currents flowing in opposite directions. It is such surface current which may be used to control debris or other material such as oil floating on the surface of the sea. Although the operation of such a pneumatic boom has been well understood when applied to still water, in the open sea, in the presence of waves and currents, its operation has not been successful.

Accordingly, it is a major object of the present invention to provide novel methods and apparatus for containment of oil slicks and the like in the open sea, in the presence of waves and currents, utilizing submerged pneumatic booms.

Experiments carried out in the course of development of the present invention have revealed that, in a sizeable wave field, the hydrodynamic mode of operation of such a pneumatic boom is very different that it is in calm water. In contrast, in a wave field, the pneumatic boom must operate in a regime of strong turbulent mixing, due to the orbital water movement created by the wave action. To understand the proposed mode of operation of a pneumatic boom in accordance with the present invention, consider a tube of length $L$, submerged to a depth $d$ below the water surface. This tube contains air under pressure which flows out of the tube through numerous small holes, forming bubbles. Let the volume flow rate of air through the tube and out the holes by $Q$. If the bubbles formed are small enough, an air-water mixture is formed which is slightly less dense than the surrounding water, and hence rises to the surface due to the action of buoyancy, and hence spreads outward, making a surface current. This maximum surface current, $U$, depends on $Q$ as ($g$ is the acceleration due to gravity):

$$U \sim \left(\frac{Qg}{L}\right)^{1/3}$$

When such a pipe is placed in the open sea, which has waves of height $a$ above and below the means surface ($S$), at a depth very much deeper than $a$, $d/a > 1$, the resulting rising column of fluid, generated by the air-water mixture formed near the pipe, rises much as it does in still water, and has a width near the surface, which is much greater than the amplitude of the orbital motion of a fluid particle in the wave field, where it splits into two surface currents which are used to control the spread of oil. However, experimental work shows that this mode of operation is more wasteful of power the deeper the pipe is placed, because the resulting surface current is independent of the depth of the pipe, being proportional to $(Qg/L)^{1/3}$, whereas the power required to pump the air increases as the hydrostatic pressure increases, such that the power requirements become excessive.

On the other hand, when such a pipe is placed at a depth just below the surface, say $d/a \approx 2$, the width of the plume is determined by the amplitude of the motion of a fluid particle in the wave field. Thus the buoyant mixture of air and water is spread over a larger volume than it would be in still water, and hence the column rises at a slower rate than it would in still water.

We have discovered that, for a given wave field, in accordance with one aspect of the present invention, there is an optimum depth, for least power consumption, at which the pipe should be placed. This depth, expressed as a ratio of $d/a$, ranges between 10 and 5, and is preferably about 8. At such depth, the maximum surface current generated is as large as it would be if the pipe were very far below the surface.

Suppose the oil is spreading at a velocity $V$, due to a combination of wind, waves, and surface tension. These effects in the open sea cause $V$ to range from about 1/3 ft./sec. to 1 ft./sec. To stop the oil from spreading, $U$ must exceed $V$ at a distance $a$ (all in the direction of wave or current movement) from the boom, because otherwise the orbital motion $W$ of the waves in such direction would carry the oil past the boom. The volume flow required is $$Q = \frac{L}{g}\left(\frac{a}{d}\right)^{3/2} 8^3 V^3$$

provided that $d/a$ is less than or equal to the optimum. The flow rate $Q$, at the optimum depth, is for a 1 ft./sec. spreading velocity, $Q/L = 1$ cu. ft./foot of pipe. If the boom were placed at $d/a = 4$, the required volume flow increased to 4 cu. ft./foot. Hence, for a given wave amplitude, doubling the depth of the boom from $d/a = 4$ to $d/a = 8$ results in a twofold savings in power, as, although the required air pressure is doubled, the volume flow rate is decreased by four. If the boom is placed deeper than the optimum, the required $Q$ is independent of depth, but the pressure and hence the power increased linearly with increasing depth.

However, it often happens that oil is carried on a current of such strength that the power requirements as determined above are excessive for the equipment available. In accordance with another aspect of the invention, it has been found that if the boom is segmented and the segments are placed at an angle $\theta$ to the oncoming current, in zigzag, accordion pleated formation, only the component of current normal to the boom need to be stopped, at a distance $X$ perpendicular to the boom segment which satisfies the above requirements as to wave induced water movement $W$, hence the above equation reads $$Q = \frac{8^3 L}{g}\left(\frac{a}{d}\right)^{3/2} V^3 \sin^3 \theta$$

A typical value of $\theta$ may be considered to be about 30°. For booms placed at this angle, the volume flow per foot is decreased by a factor of 8 whereas the overall length of the boom is increased by a factor of 2, for a four-fold savings in power.

The practical minimum angle is that at which the orbital motion of the wave would carry oil from one apex of the accordion formation to another: i.e., $\sin\theta_{min} = a/L$, where $L$ is the segment length. A typical value would be 6° for 10-foot high waves, and $L = 100'$.

The maximum angle is determined by the maximum power available. The power required per foot of boom is $$Qp/L$$

$p$ being the pressure in the pipe. For a given depth, $p$ is fixed. For a given streaming velocity, $V$, the maximum angle is given by (using the maximum $Q$ available):

$$Q \max = \frac{8^3 L}{g}\left(\frac{a}{d}\right)^{3/2} V^3 \sin^3 \theta \max$$

For the purpose of more fully explaining the invention, reference is now made to the following detailed description of a preferred embodiment, together with the accompanying drawings wherein.

Figure 1:
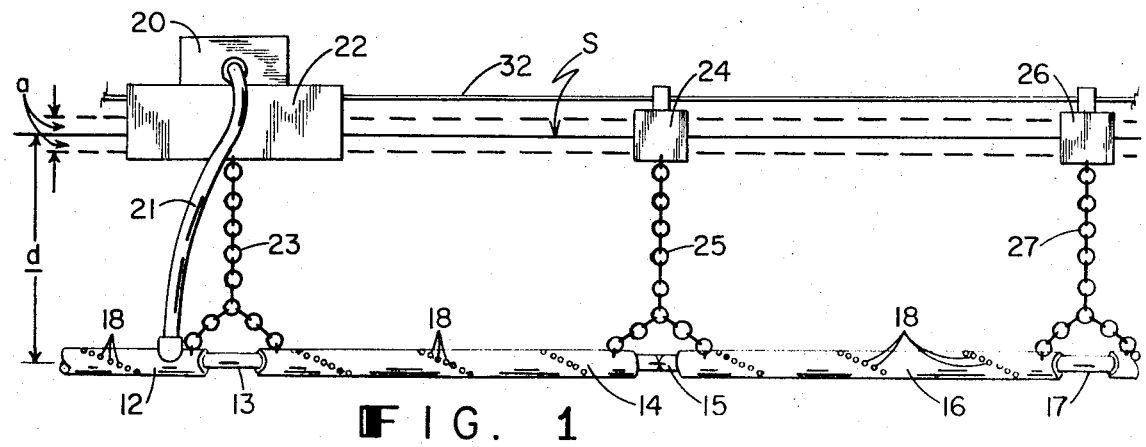
FIG. 1 is a front elevation of apparatus according to the invention for practicing the methods thereof.
Figure 2:
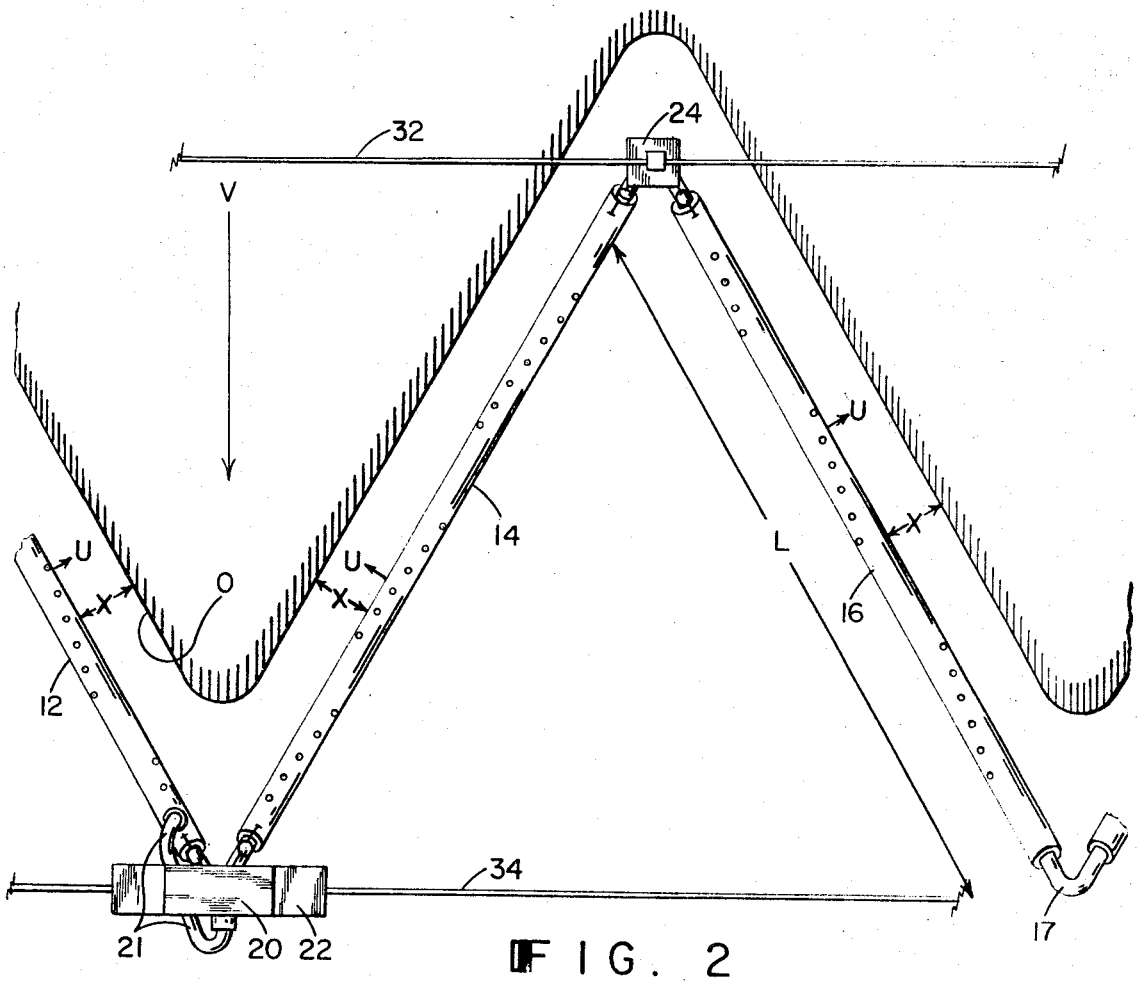
FIG. 2 is a plan view of the apparatus of FIG. 1.
Figure 3:
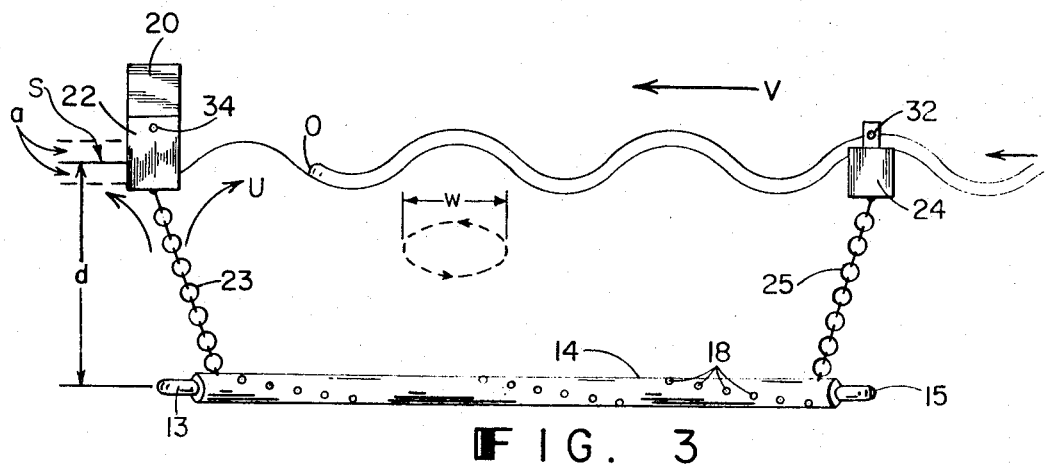
FIG. 3 is a side elevation of the apparatus of FIGS. 1 and 2.
Figure 4:
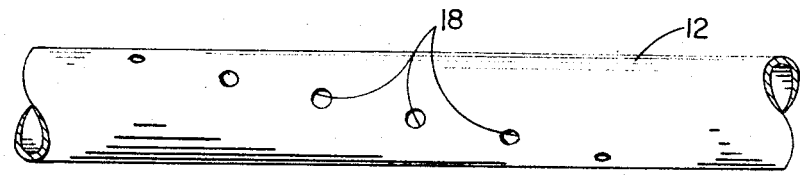
FIG. 4 is a detail view of a portion of the apparatus of FIGS. 1 and 2.

Referring to the drawings, there is shown therein pneumatic boom apparatus especially useful for oil slick containment in the open sea in the presence of waves and currents. Its basic elements consist of a plurality of linearly extending hollow pipe segments 12, 14, 16, interconnected by flexible tubing elements 13, 15, 17 and having apertures 18 preferably arranged in a helical configuration, providing an extended air bubble source. A suitable air compressor 20, connected to pipe segment 12 through line 21, provides air compressed at a suitable pressure so that streams of bubbles are produced at pipe apertures 18, the helical configuration of said apertures also serving to assure the removal of water from bubble producing pipes 12, 14, 16.

A plurality of floats 22, 24 and 26 having adjustable chains 23, 25, 27, respectively, are provided for suspending pipes 12, 14, 16 at the predetermined distance $d$, while the distance between alternate floats is controlled by control cable 32 extending between one set of alternate floats and by control cable 34 extending between the other set of alternate floats to establish the desired zigzag accordion pleated configuration of the segments comprising pipes 12, 14, 16. Suitable moorings may be provided as desired.

In operation, the apparatus of the drawings is adjusted to establish aperture pipes 12, 14, 16 to the desired predetermined depth ($d$) by means of adjustable chains 23, 25, 27 and to the desired zigzag accordion pleated configuration by means of control cables 32, 34. The latter is generally in the range of 20° to 120° included angle between adjoining segments of pipes 12, 14, 16, depending on the amount of current and power available as discussed above, as well as on the wave caused water movement which determines the minimum distance between adjoining apices of the segments of pipe. A typical value is about 60°. Compressor 20 is then started to produce bubbles at apertures 18, which bubbles rise and cause water movement $U$, which will oppose the flow $V$ of the oil slick and cause it to stop along its edge $O$, at distance $x$ from the vertical pipe projection sufficient to prevent wave induced water movement $W$ from permitting the oil edge $O$ from reaching the vertical pipe projection.

Various modifications of the invention within the spirit thereof and the scope of the appended claims will occur to those skilled in the art.

What we claim is:

1. Method of oil slick containment in the presence of waves comprising providing an extended air bubble source of accordion pleated configuration submerged beneath the surface of the sea, the distance between adjacent apices of said accordion pleated configuration being greater than wave caused water movement and said bubble source being submerged a predetermined depth ($d$) in which $d/a$ is in the range of 5 to 10, ($a$) being the value of wave amplitude.

2. Method as claimed in claim 1 wherein the included angle between adjoining segments of said accordion pleated configuration is less than about 120° and $d/a$ is about 8.